UNITED STATES PATENT OFFICE 2,156,300

CYCLIC AMIDES AND THEIR PRODUCTION

Arnold L. Lippert, Wilmington, Del., and Ebenezer E. Reid, Baltimore, Md., assignors to E. I. du Pont de Nemours & Company, Wilmington, Del., a corporation of Delaware No Drawing. Application January 2, 1935, Serial No. 174. Renewed November 24, 1936

25 Claims. (Cl. 260—239)

This invention relates to cyclic nitrogen compounds, more particularly to cyclic amides having at least eight annular atoms, and still more particularly to the preparation of such amides from dibasic aliphatic carboxylic acids and aliphatic diamines, the nitrogen atoms of which carry each at least one hydrogen atom.

It is known that ethylenediamine and ethyl carbonate when heated together in a sealed tube form ethylene urea, a crystalline water-soluble compound. This is a 5-membered cyclic aliphatic diamide. The preparation of higher membered cyclic aliphatic diamides has been reported, but with the possible exception of trimethylene urea, ethylene malonamide, and ethylene phthalamide, the description of the products clearly indicates that they are not cyclic diamides but products of indefinite composition consisting largely of polymeric material inasmuch as the products are described as amorphous insoluble products. The highest membered cyclic aliphatic diamide described in the art is ethylene malonamide, which has seven annular atoms.

Diamines and dibasic acids are bifunctional compounds and would be expected to give principally the cyclic derivative in the case of compounds presenting the possibility of rings of less than seven members, both cyclic and polymeric derivatives in the case of compounds capable of giving seven membered rings, and practically exclusively polymeric products in the case of compounds offering only the possibilities of higher membered rings. Actually polymeric products are formed almost to the exclusion of the cyclic derivatives even when there is a possibility of seven membered rings in the formation of diamides. It is evident therefore that the diamine-dibasic acid reaction has a much greater tendency to yield polymers than other bifunctional reactions which have been studied.

This invention has as an object the preparation of new and useful cyclic nitrogen compounds. A further object is the class of cyclic diamides of at least eight annular atoms hitherto unobtainable. A further object is the preparation of cyclic amides from aliphatic diamines and organic dibasic acids under conditions which retard the formation of polymeric products. Other objects will appear hereinafter.

These objects are accomplished by the following invention wherein an aliphatic dibasic carboxylic acid or an amide-forming derivative thereof such as an ester is heated with an aliphatic diamine containing replaceable hydrogens on each of the nitrogen atoms in the presence of an inert organic diluent such as methanol, the diamine and the aliphatic dibasic carboxylic acid being so chosen that the sum of the annular atoms in the cyclic amide formed is at least eight.

In the present invention the dilution principle is used in the preparation of cyclic amides from aliphatic diamines and dibasic acids. The dilution method seems absolutely essential for the preparation of cyclic aliphatic diamides having rings of at least eight members. In the case of cyclic aliphatic diamides from aliphatic dicarboxylic acids, the dilution method seems to be essential for the preparation of cyclic aliphatic diamides having rings of more than five members.

The higher cyclic diamides having rings of at least eight members can be prepared according to the present invention by heating a dibasic aliphatic carboxylic acid or an ester thereof or other amide-forming derivative of the dibasic aliphatic carboxylic acid with an aliphatic diamine having at least one replaceable hydrogen atom on each amino nitrogen, in the presence of a large amount of diluent. The following equations illustrate the two ways in which ethylenediamine, a typical aliphatic diamine, and ethyl succinate, a typical amide-forming derivative of a dibasic aliphatic carboxylic acid may react:

(1) $H_2NCH_2CH_2NH_2 + C_2H_5OOCCH_2CH_2COOC_2H_5 \longrightarrow$

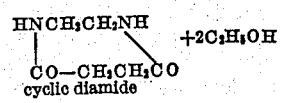

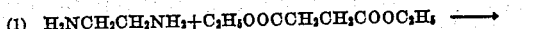
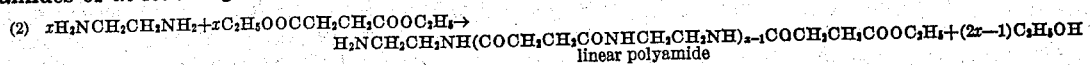

In the above equation, $x$ is an indefinite variable large number. The first step in both reactions is undoubtedly the formation of the intermediate, $$H_2NCH_2CH_2NHCOCH_2CH_2COOC_2H_5$$

which in Reaction 1 reacts intramolecularly with the formation of a cyclic compound, and in Reaction 2 reacts intermolecularly with other diamine and ester molecules to form a linear polymer. We have discovered that dilution decreases the probability of reaction between separate molecules, and for this reason favors Reaction 1.

The method for the formation of the cyclic amides is not complicated. Substantially equimolecular amounts of the diamine and dibasic acid ester or other amide-forming derivative of the dibasic acid are added slowly and at approximately the same rate from separate inlets into a reactor containing a large amount of diluent. The diluent is heated to approximately 100° C. and is well stirred. The mixture generally becomes turbid immediately and a white solid soon forms and increases in quantity until the end of the reaction.

The separation of the various products of the reaction is more difficult. The usual procedure consists in filtering the cooled reaction mixture and subjecting the residue to alcohol extraction, the portion insoluble on extraction consisting of polyamide. The filtrate and alcohol extract contain the cyclic amide together with some dimer and intermediate products. The monomer and dimer are separated by taking advantage of the difference in their temperatures of sublimation at a given pressure. Usually there is very little dimer present. The monomer, cyclic diamide, is separated from impurities, e. g., intermediate products such as the diamino-N-alkyl amides and the monomeric esters of alkylene amidic acids, by distillation, sublimation, or recrystallization or by combinations of these methods.

The effect of dilution on the relative amounts of polyamide and monomeric cyclic diamide formed has already been disclosed. Although the total yield of products formed in a given time decreases with dilution, the percentage yield of polymer decreases while the percentage yield of monomer increases. Thus, the ratio of monomer to polymer may often be doubled by doubling the amount of diluent employed. Increase in temperature also appears to increase the ratio of monomer to polymer.

The type of diluent employed also plays an important role in determining the relative amounts of monomer and polymer formed. Hydrocarbon diluents are generally not favored inasmuch as their use favors the formation of polymeric products. Alcohols are more suitable diluents for the preparation of the cyclic amides and may generally be used, but even among alcohols there is a large difference in the ratio of monomer to polyamide. Of the various alcohols tried methanol gives by far the greatest ratio of monomer to polyamide.

The various cyclic amides prepared following the general principles outlined above are given in Table I. The amides were identified by analysis and molecular weight determinations. The products had fairly definite melting points. Their molecular weights were not altered by recrystallization. The cyclic amides showed no tendency to polymerize. The lower members are soluble in water and in alcohol; the higher members are soluble in alcohol but less soluble in water. The melting point appears to decrease with increase in the molecular weight of the dibasic acid used.

TABLE I

Cyclic amides

|  | Molecular weight |  | M. P. (approx.) | Annular atoms |
|---|---|---|---|---|
|  | Calc. | OBS. |  |  |
| Ethylene succinamide | 142 | 130 | 310 | 8 |
| Ethylene glutaramide | 156 | 168 | 235 | 9 |
| Ethylene adipamide | 170 | 162 | 275 | 10 |
| Ethylene pimelamide | 184 | 178 | 240 | 11 |
| Ethylene suberamide | 198 | 214 | 235 | 12 |
| Ethylene azelamide | 212 | 206 | 220 | 13 |
| Ethylene sebacamide | 226 | 205-247 | 225 | 14 |
| Diethylene oxamide | 228 | 223 | | 12 |
| Diethylene adipamide | 340 | 326 | 250 | 20 |

Having outlined above the general principles and purposes of the invention, the following exemplifications thereof are added for illustration but not in limitation:

*Example 1—Ethylene adipamide*

To 100 cc. of technical methanol placed in a round-bottomed flask fitted with a reflux condenser were added 12 g. of 95-100% ethylene diamine and 51.6 g. of dibutyladipate. The reactants were added simultaneously during the course of about 20 minutes. The mixture was then refluxed for 46 hours, cooled to room temperature, and filtered to remove the solid formed. The solid was extracted with 600 cc. of boiling ethyl alcohol. Two grams of polymeric material remained undissolved. The alcoholic solution upon standing deposited monomeric ethylene adipamide as a white solid. This solid was filtered off and recrystallized from ethyl alcohol. It was relatively insoluble in water and in dilute hydrochloric acid, soluble in alcohol, and melted at 275°-280° C. The yield of ethylene adipamide was 4.2 g. which is 24.7% of the theoretical.

Anal. calcd. for $C_8H_{14}O_2N_2$: C, 57.70; H, 8.23; mol. wt. 170. Found: C, 57.61; H, 8.27; mol. wt. (in betanaphthol), 162.

*Example 2—Dimeric ethylene adipamide*

To 50 cc. of methanol placed in a round-bottomed flask equipped with a reflux condenser were added 12 grams of 95-100% ethylenediamine and 51.6 grams of dibutyl adipate, and the solution was refluxed for 40 hours. After 30 hours the light yellow solution became turbid and a white solid began to separate. On cooling a considerable amount of solid separated. This solid consisting largely of monomeric ethylene adipamide (Example 1) was filtered off. The filtrate was evaporated almost to dryness and the residue thus obtained extracted with 1200 cc. of boiling ethyl alcohol which dissolved all but 5 grams of polymeric material. When the alcoholic solution was allowed to cool, a finely divided solid separated out and was removed by filtration. This solid, which proved to be dimeric ethylene adipamide, was recrystallized twice from ethyl alcohol. It was a light yellow powder insoluble in water and dilute hydrochloric acid but soluble in alcohol. It melted at 250°-255° C. with decomposition. The dimeric ethylene adipamide obtained amounted to 1.8 grams which is 10.6% of the theoretical.

Anal. calcd. for $C_{16}H_{28}O_4N_4$: C, 57.70; H, 8.23; mol. wt. 340. Found: C, 57.77; H, 8.40; mol. wt. (in betanaphthol), 326.

Dimeric ethylene oxamide was prepared in much the same manner by reacting ethylenediamine with ethyloxalate in the presence of methanol, by-products of the reaction being monomeric ethylene oxamide and polyamides of higher molecular weight than the dimer.

Example 3—Ethylene pimelamide

To 100 cc. of technical methanol placed in a round-bottomed flask fitted with a reflux condenser were added 12 grams of 95–100% ethylenediamine and 43.2 grams of diethyl pimelate, and the solution was refluxed for 48 hours. A precipitate began to form after 20 hours. After 48 hours the solution was evaporated to a mush. The residue was extracted with 500 cc. of hot ethyl alcohol. One hundred cubic centimeters of benzene were added to the alcoholic solution which was then allowed to cool. After standing 24 hours the resulting solid was filtered. The material was recrystallized from 250 cc. of alcohol and 50 cc. of benzene. Evaporation of the filtrates resulted in the production of various products, including ethylene pimelamide. This cyclic diamide was a light yellow powder melting at 245°–50° C. with decomposition. It was insoluble in water and dilute hydrochloric acid, but soluble in ethyl alcohol. The yield of the ethylene pimelamide obtained was 0.93 gram which is 2.5% of the theoretical. The total yield of condensation product was 10.5 grams which is 28.4% of the theoretical.

Anal. calcd. for $C_9H_{16}O_2N_2$: C, 59.24; H, 8.70; mol. wt. 184. Found: C, 58.95; H, 9.19; mol. wt. (in beta-naphthol), 178.

Example 4—Ethylene azelamide

Six grams of 95–100% ethylenediamine, 24.4 grams of diethyl azelate, and 50 cc. of technical methanol were placed in a round-bottomed flask equipped with a reflux condenser and the mixture refluxed for 48 hours. The soluble material was extracted from the reaction product with one liter of boiling ethyl alcohol. The alcoholic solution was evaporated to 400 cc. and 100 cc. of benzene were added while hot. Recrystallization from alcohol alone was impossible due to colloidal solutions. Upon cooling a grey solid separated which was removed by filtration. This material was recrystallized from alcohol and benzene in the same proportions as the above. The ethylene azelamide thus obtained was a very light grey powder, melting at 215–20° C. with slight decomposition and subliming with considerable decomposition at 325° C. at a pressure at 2 mm. It was insoluble in water and in dilute hydrochloric acid, soluble in alcohol, and slightly soluble in acetone. The yield of ethylene azelamide was 2.5 grams which is 12.0% of the theoretical. The total yield of condensation product was 6 grams which is 28.3% of the theoretical.

Anal. calcd. for $C_{11}H_{20}O_2N_2$: C, 62.26; H, 9.43; mol. wt. 212. Found: C, 62.13; H, 9.47; mol. wt. (in beta-naphthol), 206.

It was found that the polyamide obtained from ethylenediamine and ethyl carbonate could be depolymerized to the corresponding monomeric cyclic diamide, ethylene urea, by heating it in the presence of sodium. Other polyamides which were examined did not appear to be susceptible to depolymerization. Thus, the products described in Table I could not be obtained from the corresponding polyamides by depolymerization.

The preparation of cyclic amides is not limited to the use of the diamines cited in the above examples. Primary amines react most readily but secondary amines are also operative. When a secondary amine is used, it is generally advisable to react it with the diphenyl ester of the dibasic acid. Aliphatic diamines containing a replaceable hydrogen atom on each amino nitrogen may generally be employed. As examples thereof, there may be used: trimethylenediamine, tetramethylenediamine, pentamethylenediamine, decamethylenediamine, propylenediamine ($CH_3CH(NH_2)CH_2NH_2$), and 1,4-diaminopentane.

Aliphatic dibasic carboxylic acids or amide-forming derivatives thereof in general may be used to make the cyclic amides. However, it is generally more desirable to use the diester of the acid, but the free acid, the anhydride, chloride, or half ester may be used with some success. Thus, dicarboxylic acids such as oxalic, malonic, brassylic, methylmalonic, methylsuccinic, dimethylsuccinic, beta-methylpimelic, and pentamethylenedicarboxylic acids may be employed as such or as the half ester, diacid chloride, or anhydride, but best results are obtained from diesters thereof with monohydric alcohols or phenols of low molecular weight. Carbonic acid may be employed as such (e. g., aqueous carbon dioxide under pressure) or as the diacid chloride (phosgene), but best results are secured by using esters of carbonic acid with volatile monohydric alcohols or phenols.

Altho aliphatic diamines and dibasic aliphatic carboxylic acids in general may be employed, it is essential in order to obtain products of the type coming within the scope of the present invention that such a combination of amine and acid be chosen that the cyclic amide formed has at least eight annular atoms. This means that if the lowest member of the diamine series (ethylenediamine) be chosen as the amine, the lowest member of the organic dibasic acid series to give an amide coming within the scope of this invention is succinic. On the other hand, if the lowest member in the dibasic acid series be selected (carbonic acid), the lowest member of the diamine series to be used to give the diamides of the present invention is pentamethylenediamine.

In the examples methanol is the diluent used. Other alcohols, e. g., ethanol, propanol, butanol, etc., may also be used. Methanol is a much preferred diluent. Other types of inert diluents may also be employed, such as hydrocarbons, ketones, esters, ethers, etc. Ketones, esters and hydrocarbons are less satisfactory, the hydrocarbon diluents being the least satisfactory. Inert oxygenated organic diluents may generally be used.

The reaction generally takes place slowly at ordinary temperatures. It is usually desirable to employ temperatures of 50–150° C. The reaction can be carried out under reduced or increased pressure.

This invention provides a method for the preparation of cyclic amides unobtainable by any other procedure thus far developed. Although the yields are not high, the procedure is relatively simple and the principal by-products, the polyamides, are useful materials as disclosed in copending application Serial No. 181, filed of even date herewith. The cyclic diamides have possible application as dye intermediates and as pharmaceuticals.

The above description and examples are intended to be illustrative only. Any modification of or variation therefrom which conforms to the spirit of the invention is intended to be included within the scope of the claims.

We claim:
1. Process of preparing ethylene adipamide, which comprises refluxing a mixture of 12 g.

ethylenediamine, 51.6 g. dibutyl adipate, and 100 cc. of methanol for 46 hours, cooling, filtering off the resulting solid material, extracting the same with 600 cc. boiling ethanol, and isolating and purifying the ethylene adipamide which crystallizes from the ethanol on cooling.

2. Process of preparing ethylene adipamide, which comprises heating ethylene diamine and an ester of adipic acid in approximately equimolar quantities in the presence of methanol as a diluent.

3. Process of preparing ethylene adipamide, which comprises heating ethylenediamine with an ester of adipic acid in the presence of an aliphatic alcohol as a diluent.

4. Process of preparing cyclic amides of at least eight annular atoms, which comprises heating an ester of a dibasic aliphatic carboxylic acid with an aliphatic diamine, in the presence of methanol, the number of the chain atoms between and inclusive of the nitrogen atoms of the diamine plus the number of chain atoms between and including the carboxyl carbon of the acid derivative being at least eight.

5. Process of preparing cyclic amides of at least eight annular atoms, which comprises heating an ester of a dibasic aliphatic carboxylic acid with an aliphatic diamine, in the presence of an aliphatic alcohol, the number of the chain atoms between and inclusive of the nitrogen atoms of the diamine plus the number of chain atoms between and including the carboxyl carbon of the acid derivative being at least eight.

6. Process of preparing cyclic amides of at least eight annular atoms, which comprises heating an amide-forming derivative of a dibasic aliphatic carboxylic acid with an aliphatic diamine, in the presence of an aliphatic alcohol, the number of the chain atoms between and inclusive of the nitrogen atoms of the diamine plus the number of chain atoms between and including the carboxyl carbon of the acid derivative being at least eight.

7. Process of preparing cyclic amides of at least eight annular atoms, which comprises heating together in the presence of an aliphatic alcohol an aliphatic diamine and a substance from the class consisting of aliphatic dibasic carboxylic acids and amide-forming derivatives thereof, the ingredients being so selected that the number of chain atoms between and inclusive of the nitrogen atoms of the diamine plus the number of chain atoms between and inclusive of the carboxyl carbon of the acid or acid derivative is at least eight.

8. Monomeric ethylene adipamide.

9. Monomeric cyclic amides of the formula:

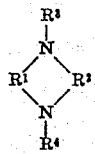

where $R^1$ is a divalent aliphatic radical, $R^3$ and $R^4$ are hydrogen or monovalent hydrocarbon radicals, and $R^2$ is the divalent radical formed from a dibasic aliphatic carboxylic acid by removal of the carboxyl hydroxyls, the sum of the annular atoms in $R^1$ and $R^2$ being at least six.

10. The amides of claim 9 wherein $R^2$ is the divalent radical $-OC-(CH_2)_n-CO-$ wherein $n$ may be 0 or a positive integer.

11. Monomeric cyclic amides of at least eight annular atoms and derived from an aliphatic diamine having at least one replaceable hydrogen on each nitrogen and a dibasic aliphatic carboxylic acid.

12. Amides of claim 9 wherein $R^3$ and $R^4$ are hydrogen atoms.

13. Monomeric cyclic amides of the formula

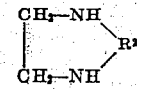

wherein $R^2$ is the divalent radical formed from a dibasic aliphatic carboxylic acid by removal of the carboxyl hydroxyls, the sum of the annular atoms in $R^2$ being at least four.

14. The amides of claim 9 wherein $R^2$ is the divalent radical formed from an aliphatic dicarboxylic acid by removal of the carboxyl hydroxyls, the sum of the annular atoms in $R^1$ and $R^2$ being at least six.

15. The amides of claim 9 wherein $R^2$ is
$OC-CH_2-CH_2-CH_2-CH_2-CO$

16. A cyclic ethylene adipamide.

17. A cyclic ethylene azelamide.

18. Monomeric ethylene azelamide.

19. A cyclic ethylene sebacamide.

20. Monomeric ethylene sebacamide.

21. A compound selected from the class consisting of monomeric and dimeric cyclic amides derived from an aliphatic, dibasic carboxylic acid and an aliphatic diamine having at least one replaceable hydrogen on each nitrogen, the sum of the atoms in the chains of the amine and the acid, inclusive of the amino nitrogen and the carboxyl carbon, being at least eight.

22. Process of preparing ethylene adipamide, which comprises heating ethylenediamine with an ester of adipic acid in the presence of an inert, oxygen containing, organic diluent.

23. Process of preparing cyclic amides of at least eight annular atoms, which comprises heating an ester of a dibasic aliphatic carboxylic acid with an aliphatic diamine, in the presence of an inert, oxygen containing, organic liquid, the number of the chain atoms between and inclusive of the nitrogen atoms of the diamine plus the number of chain atoms between and including the carboxyl carbon of the acid derivative being at least eight.

24. Process of preparing cyclic amides of at least eight annular atoms, which comprises heating an amide-forming derivative of a dibasic aliphatic carboxylic acid with an aliphatic diamine, in the presence of an inert, oxygen containing, organic liquid, the number of the chain atoms between and inclusive of the nitrogen atoms of the diamine plus the number of chain atoms between and including the carboxyl carbon of the acid derivative being at least eight.

25. Process of preparing cyclic amides of at least eight annular atoms, which comprises heating an amide-forming derivative of a dibasic aliphatic carboxylic acid with an aliphatic diamine, in the presence of an inert, oxygen-containing, organic liquid, the number of the chain atoms between and inclusive of the nitrogen atoms of the diamine plus the number of chain atoms between and including the carboxyl carbon of the acid derivative being at least eight.

ARNOLD L. LIPPERT.
EBENEZER E. REID.